United States Patent

[11] 3,604,143

| [72] | Inventor | Charles T. Sauers |
| | | 412 E. Princeton, Ontario, Calif. 91762 |
| [21] | Appl. No. | 838,555 |
| [22] | Filed | July 2, 1969 |
| [45] | Patented | Sept. 14, 1971 |

[54] DOUBLE-EYE FISHHOOK
2 Claims, 5 Drawing Figs.

[52] U.S. Cl. .................................................. 43/44.83
[51] Int. Cl. ......................................................... A01k 91/04
[50] Field of Search............................................ 43/44.83,
43.16, 44.4, 42.49; 24/131 C

[56] References Cited
UNITED STATES PATENTS
| 788,136 | 4/1905 | Heilrath ...................... | 24/131 C UX |
| 2,222,277 | 11/1940 | Baker........................... | 24/131 X C |
| 2,984,882 | 5/1961 | Winn............................ | 43/44.83 X |

FOREIGN PATENTS
| 641,085 | 5/1962 | Canada ........................ | 43/44.83 |
| 1,014,372 | 8/1957 | Germany...................... | 43/43.16 |
| 793 | 1884 | Great Britain................ | 43/44.83 |

Primary Examiner—Samuel Koren
Assistant Examiner—J. F. Pitrelli
Attorney—Fowler, Knobbe & Martens ABSTRACT: A fishhook with a shank having a guide at one end and a bight with a barbed point at the other end, and an anchor eye formed on the shank between the guide eye and the bight. The fishhook is secured to the fishing line by passing the line through the guide eye wrapping it around the shank, passing the line through the anchor eye wrapping it around the shank again and passing it back through the guide eye.

PATENTED SEP14 1971  3,604,143

INVENTOR.
CHARLES T. SAUERS
BY
FOWLER, KNOBBE
& MARTENS
ATTORNEYS.

DOUBLE-EYE FISHHOOK

BACKGROUND OF THE INVENTION

The present invention relates to fishing tackle and more particularly to a fishhook design which facilitates the frictional engagement of the fishhook to a fishing line.

DESCRIPTION OF THE PRIOR ART

The ordinary fishhook has an eye at one end and a bight with a barbed point at the other end. It is secured to a fish line by looping the line through the eye and tying the line back upon itself. This means of engaging a fishhook to a fishing line is normally satisfactory but causes the line to break in the loop at the eye when the strength limit of the line is approached even through the limit is not exceeded due to the higher stress present in the loop than is present elsewhere in the line.

SUMMARY OF THE INVENTION

The present invention eliminates the necessity for the loop in the line through the eye by providing a guide eye at one end of the fishhook and an anchor eye formed on the shank between the guide eye and the bight dividing the shank into an upper and a lower segment. To secure the fishhook to a fishing line, the line is guide on to the upper segment of the shank by passing it through the guide eye. The line is then wrapped a plurality of times around the upper shank, passed through the anchor eye and then either (1) wrapped a plurality of times around the lower shank segment, passed back through the anchor eye, wrapped around the upper shank segment again, and then passed back through the guide eye or (2) back the upper shank segment and passed back through the guide eye. A malleable wire tie may then be tied around the strands of line passing through the guide eye to secure the end of the line to the main strand. By thus eliminating the loop in the line at the eye, the line will not break until its test strength has been exceeded.

A further advantage of the present invention is the ease and speed with which the fishhook may be secured to the fishing line or leader.

DESCRIPTION OF THE INVENTION

Figure 1:
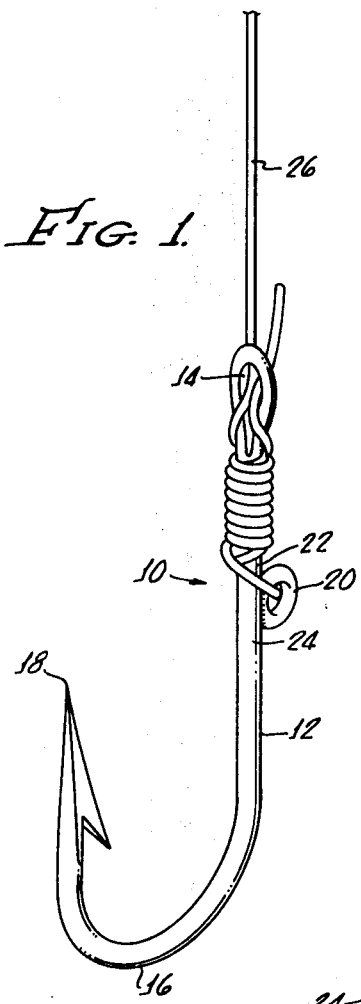
FIG. 1 is a perspective view of one embodiment of the present invention secured to a fishing line.

Referring to the drawings in detail, FIG. 1 shows an fishhook generally designated at 10 embodying one form of the present invention. The fishhook 10 includes a straight shank 12 having a guide eye 14 at one end and a bight 16 terminated in a barbed point 18 at the other end. An anchor eye 20 is formed on the shank 12 between and remote from the guide eye 14 and the bight 16. Hereinafter the portion of the shank 12 between the guide eye 14 and the anchor eye 20 will be referred to as the upper shank segment 22 and the portion between the anchor eye 20 and the bight 16 will be referred to as the lower segment 24. The anchor eye 20 is mounted on the shank 12 and may be secured in any suitable manner such as by welding, silver soldering, or braising.

Figure 2:
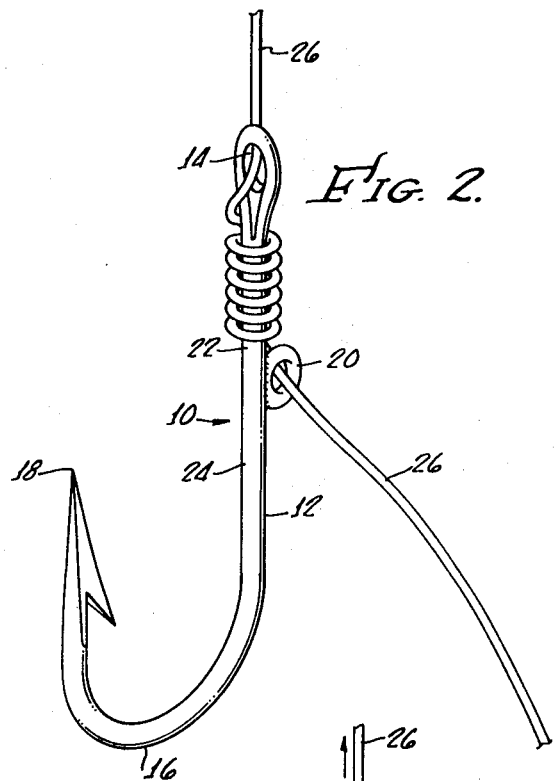
FIGS. 2 and 3 are perspective views of the present invention illustrating one method of securing the fishhook to a fishing line.
Figure 3:
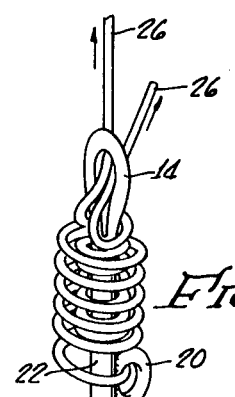

Referring to FIGS. 2 and 3 together, there is illustrated one method of frictionally securing the fishhook 10 to a flexible fishing line 26. In FIG. 2 a fishing line 26 is shown as being guided onto the upper shank segment 22 by the guide eye 14 and wrapped a plurality of times around the segment 22 before passing through the anchor eye 20. The fishing line 26 is then wrapped around the upper segment 22 again and passed through the guide eye 14 as shown in FIG. 3. The line 26 is tightened by pulling both strands which pass through the guide eye 14.

Figure 4:
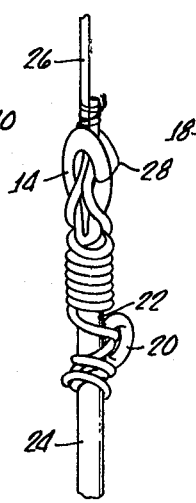
FIG. 4 illustrates a second method of securing the fishhook to a fishing line.

An alternate method of securing the fishhook 10 to the fishing line 26 is shown in FIG. 4. The line 26 is again guided onto the upper shank segment 22 by the guide eye 14, wrapped around the segment 22 and passed through the anchor eye 20. The line 26 is then wrapped a plurality of times around the lower shank segment 24, passed back through the anchor eye 20, wrapped around the upper shank segment 22, and passed through the guide eye 14. The extra wraps of the line 26 on the lower shank segment 24 after the line is passed through the anchor eye 20 add to the shock capacity of the fishhook-fishing line combination.

A tie 28 may be employed to secure the end of the line 26 to the main strand passing through the guide eye 14 by passing it through the guide eye 14 and wrapping or twisting it around the strands of the line 26 as shown in FIG. 4. The tie 28 may be made of soft annealed fine braid wire, plastic, rubber, or other material that will mold or shape.

Figure 5:
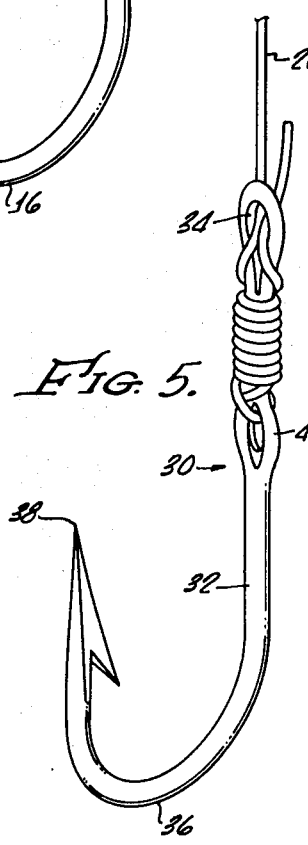
FIG. 5 is a perspective view of an alternate embodiment of the present invention.

An alternate embodiment of the present invention is shown in FIG. 5. The alternate embodiment 30 is similar to the embodiment 10 shown in FIG. 1 and includes a straight shank 32 having a guide eye 34 at one end and a bight 36 with a barbed point 38 at the other end. The embodiment 30 differs from the embodiment 10 in that an anchor eye 40 is formed integrally in the shank 32 when the fishhook is made, as by stamping or molding. The embodiment 30 may be secured to the fishing line in either of the two methods described in conjunction with FIGS. 2, 3 and 4.

I claim:

1. A fishing apparatus comprising:

a double eye fishhook having a substantially straight shank with a guide eye at one end, a bight terminated with a barbed point at the other end and an anchor in the form of a second eye formed on said straight shank at a position between and remote from said guide eye and said bight, said second eye dividing the shank into upper and lower segments;

a flexible fishing line passed through said first eye, wrapped around said upper shank segment, passed through said second eye, wrapped again around said upper shank segment, and passed again through said first eye, whereby said fishhook is frictionally secured to said fishing line; and a malleable wire tie passed through said first eye and twisted around said strands of fishing line which pass through said first eye.

2. A fishing apparatus comprising:

a double eye fishhook having a substantially straight shank with a guide eye at one end, a bight terminated with a barbed point at the other end and an anchor in the form of a second eye formed on said straight shank at a position between and remote from said guide eye and said bight, said second eye dividing the shank into upper and lower segments;

a flexible fishing line passed through said first eye, wrapped around said upper shank segment, passed through said second eye, wrapped around said lower shank segment, passed again through said second eye, again wrapped around said upper shank segment, and passed again through said first eye, whereby said fishhook is frictionally secured to said fishing line; and a malleable wire tie passed through said first eye and twisted around said strands of fishing line which pass through said first eye.